(No Model.) 2 Sheets—Sheet 1.

G. STEVENSON.
BROADCAST SEED SOWER.

No. 309,581. Patented Dec. 23, 1884.

Witnesses:
E. H. Dick
J. Walter Blandford

Inventor:
George Stevenson
by C. H. Watson & Co.
Attorneys (No Model.) 2 Sheets—Sheet 2.
G. STEVENSON.
BROADCAST SEED SOWER.

No. 309,581. Patented Dec. 23, 1884.

Witnesses: Inventor:
George Stevenson
by C. H. Watson &Co.
Attorneys.

UNITED STATES PATENT OFFICE.

GEORGE STEVENSON, OF ZIONSVILLE, INDIANA.

BROADCAST SEED-SOWER.

SPECIFICATION forming part of Letters Patent No. 309,581, dated December 23, 1884.

Application filed May 19, 1884. (No model.)

*To all whom it may concern:*

Be it known that I, GEORGE STEVENSON, of Zionsville, county of Boone, and State of Indiana, have invented certain new and useful Improvements in Broadcast Seed-Sowers, of which the following is a full, clear, and exact description.

My invention relates to centrifugal seed-sowers which are supported upon the body of the operator and operated by hand. Such a machine is described and illustrated in Letters Patent No. 31,952, dated April 9, 1861.

The object of my invention is to furnish a machine which will overcome the many objections now prevalent in this class of seed-sowers, and at the same time possess all the characteristics and advantages thereof, and prevent the ground being double sown, as is the case with machines now almost universally used, thereby increasing the efficiency and value of the machine.

In order to accomplish the best results with a machine of this character, it is eminently important that the seed-discharger should be so arranged and constructed as to overcome all liability to clogging, so that the seed may have free passage and be thrown therefrom with as much force as possible.

I have discovered that by arranging angle-bars or the like within the grooves or channels of an ordinary seed-discharger the seed is likely to be clogged, and that the cost of manufacture is increased thereby, and the operation slow, uncertain, and unsatisfactory. To this end I form on the interior of the discharger channels or grooves free from the well-known angle-bars or the like, which tend to obstruct the free passage of the seed, and place above the periphery of the discharger a cap, whereby seed may be sown regularly and evenly distributed without clogging; and by employing centrifugal force produced by rapid motion given to the machine by the operator, which effectually scatters the seed, I am enabled thereby to save much time and labor and obtain better results.

In order to enable others skilled in the art to which my invention pertains to make and use the same, I will now proceed to describe its construction and operation, reference being had to the accompanying drawings, in which—

Figure 1:
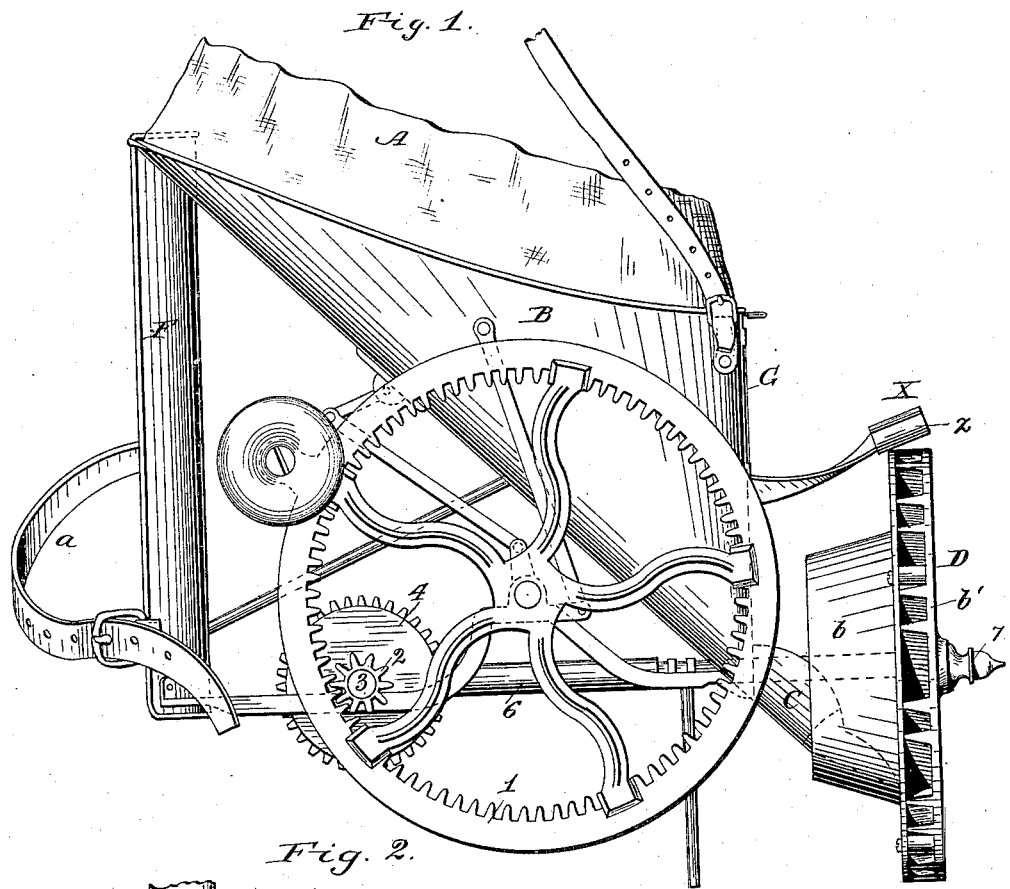
Figure 2:
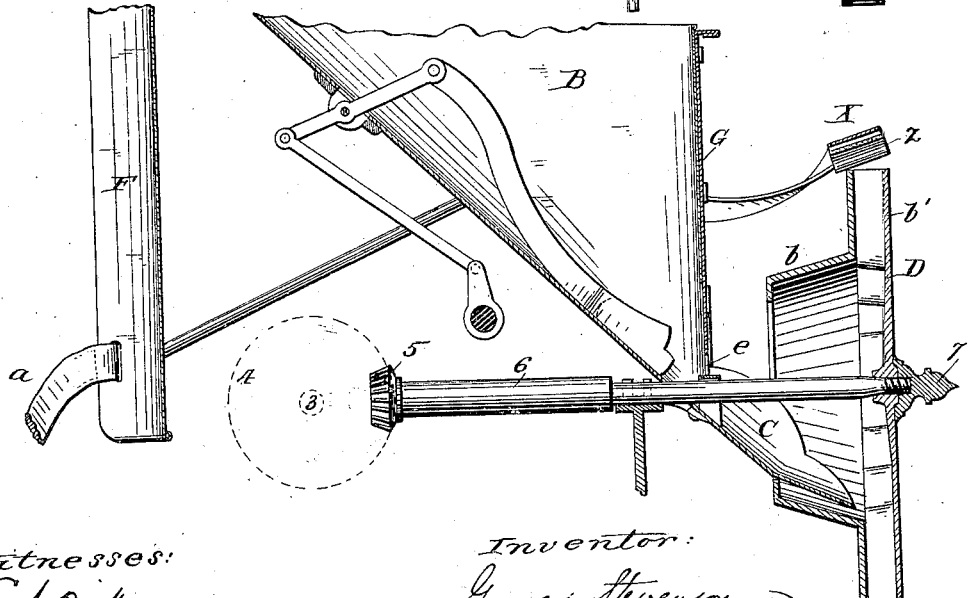
Figure 3:
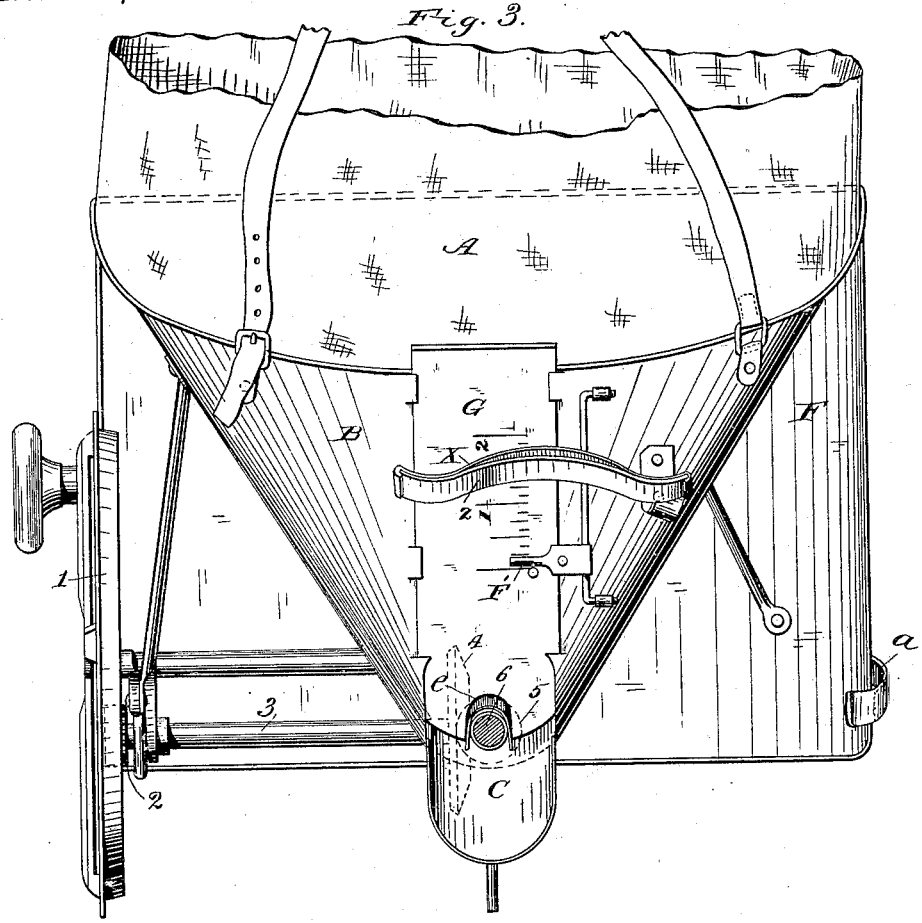
Figure 4:
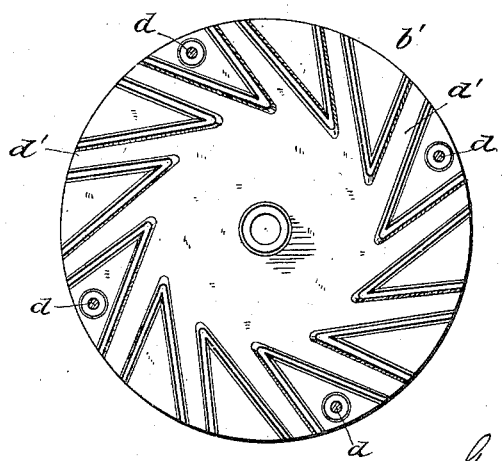

Figure 1 is a side elevation of a machine embodying my improvements. Fig. 2 is a sectional elevation of the interior of the discharger. Fig. 3 is a front view of the machine, and Fig. 4 is a detail view of the grooved portion of the discharger detached.

In said drawings, A represents the hopper, which is made of canvas or suitable material, and is of sufficient capacity to contain as much seed as an operator can carry with convenience. The lower end of the hopper is connected with a funnel-shaped conductor, B, which is of sheet metal, and terminates in a spout, C, that delivers the seed into the centrifugal discharger D.

1 is the driving-wheel by which the machine is operated, and 2 is the pinion.

To the other end of the shaft 3 is a pinion, 4, which meshes with pinion 5 on the shaft 6, upon which is rigidly secured, by a screw-nut, 7, the centrifugal discharger D. The said seed-discharger is mounted upon the horizontal shaft 6, and extends in the direction in which the machine is carried forward over the ground to be sown. This shaft is arranged to revolve in suitable bearings which are connected rigidly with and supported by a breastplate, F, which is suitably curved to fit the body, and is provided with straps $a$ $a$, by which it can be secured to the body of the operator.

G is an adjustable slide working in guides on the front of the hopper for the purpose of regulating the quantity of seed to be sown. This slide is made with a small aperture, $e$, in its lower end.

An index-finger, F', to point at suitable graduations on the slide G, for setting the slide at any given point, is secured to the hopper, as seen in the drawings.

The arrangement thus far described is substantially like that shown and described in the Letters Patent aforesaid.

I now come to describe the construction of the seed-discharger and the cap hereinbefore referred to. It is to these two elements that my invention is mainly directed. The seed-discharger in this instance is of preferably circular form, and is composed of two parts, $b$ $b'$, which are secured together in the proper position by screws $d$. The bowl-shaped part (marked $b$) is provided with a rather broad flange. A hole of sufficient size is formed in the center of part $b$, through which the seed passes to be fed to the discharger. The part $b'$ is disk-shaped, and has formed upon its interior, near its edge, a series of bars or ribs, $d^2$, forming grooves or channels $d'$, which are slanted or inclined and free from angle-bars, ribs, or the like, as seen in the drawings. I make these channels wider at the point where the seed enters than where it is discharged, so as to concentrate the seed before it is fed from the discharger, and by that means the seed is thrown with greater force upon the ground. I would remark that in the present instance said grooves or channels are formed integral with part $b'$; but they may be made separate and secured thereto in a variety of ways.

In order to prevent the seed from clogging the machine, I have arranged this series of grooves around the interior, near the edge of the discharger, in such manner that they do not extend up to the center of the interior of the discharger. It will thus be seen that I in this way afford sufficient space for the seed to be moved about in.

To overcome any liability of the seed in the discharger being thrown upward, thereby double sowing a greater portion of the ground, I make use of and secure to the front of the machine, at a suitable distance above the discharger, a curved bracket, which I term the "cap," X. It is secured to the machine by screws, and is provided on its side nearest the discharger with some soft material, $z$, which will not bruise the seed should it be thrown upward so as to come in contact therewith.

Having fully described my improvement and the manner in which the same is or may be carried into effect, what I claim, and desire to secure by Letters Patent, is—

1. In a centrifugal seed-sower, a seed-discharger having formed upon its interior a central annular space by means of a series of inclined or slanting bars or ribs, each of said bars or ribs beginning at and radiating directly from a line surrounding said annular space, and forming a series of grooves or channels tapering toward their discharge ends, substantially as and for the purposes set forth.

2. In a seed-sower, the seed-discharger composed of two parts, and having slanting or inclined bars or ribs $d^2$, forming grooves or channels, substantially as described, in combination with a cap, X, provided with a pad of soft material, for the purposes specified.

3. The combination, with a seed-sower of the kind herein described, of a cap, X, and the pad $z$, as and for the purposes set forth.

In testimony whereof I have hereunto set my hand.

GEORGE STEVENSON.

Witnesses:
 H. K. PENDERGAST,
 G. R. LANE.